Patented May 20, 1924.

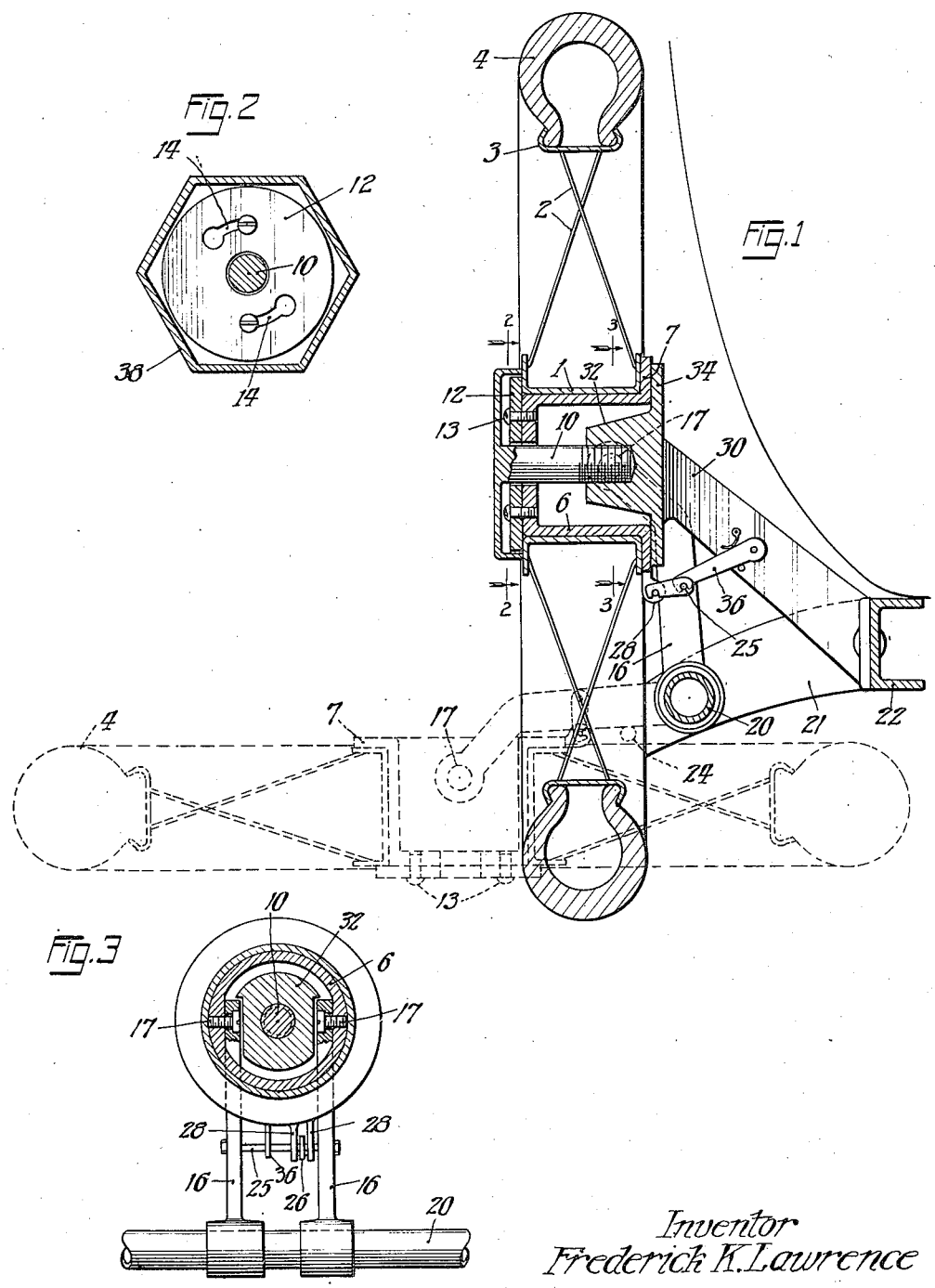

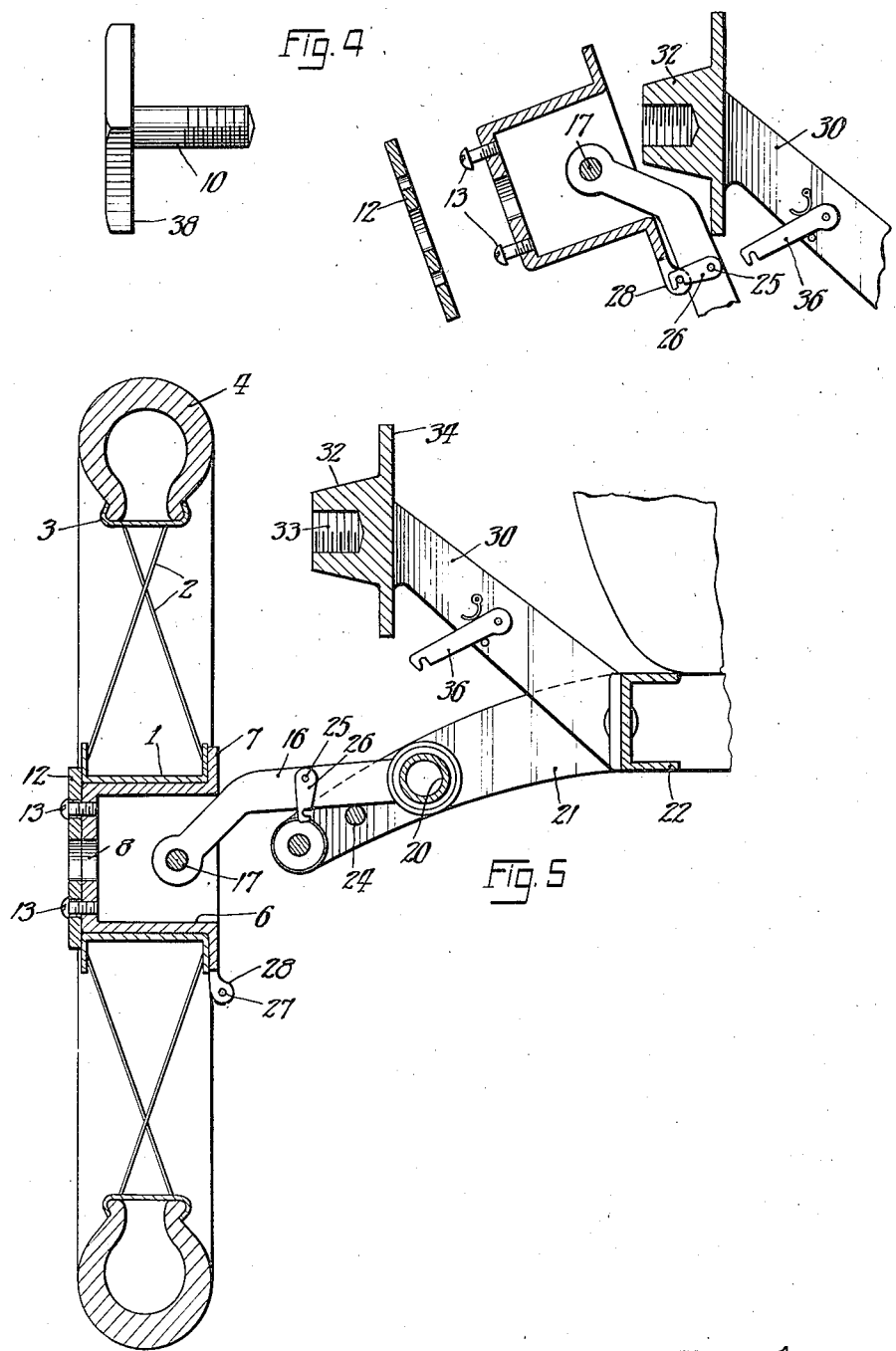

1,495,023

UNITED STATES PATENT OFFICE.

FREDERICK K. LAWRENCE, OF CHICAGO, ILLINOIS, ASSIGNOR, BY DIRECT AND MESNE ASSIGNMENTS, TO THE SELF-MOUNTING CARRIER COMPANY, OF WILMINGTON, DELAWARE, A CORPORATION OF DELAWARE.

CARRIER FOR SPARE WHEELS AND THE LIKE.

Application filed September 19, 1921. Serial No. 501,604.

*To all whom it may concern:*

Be it known that I, FREDERICK K. LAWRENCE, a citizen of the United States, residing at Chicago, in the county of Cook and State of Illinois, have invented a certain new and useful Improvement in Carriers for Spare Wheels and the like, of which the following is a specification.

My invention relates to carriers for spare wheels, by which I mean to include any tire mounting whether it be simply a demountable rim or a complete wheel. For present purposes the tire may also be considered as part of the wheel. The object of the invention is to provide a carrier so constructed that the wheel itself may furnish leverage which will make it easier for the operator to raise the wheel from the ground to traveling position and vice versa. For cars of the larger sizes the weight of the wheel is so great that a single operator experiences considerable difficulty in positioning and removing it. Not only is the weight considerable, but the tires with their rims or wheels are bulky and difficult to handle, especially if the operator wishes to prevent his clothing from becoming soiled.

My object, broadly considered, it to provide means which will assist the operator in making the necessary manipulations. Viewed from a narrower aspect, it is my purpose to provide a rack so constructed that the operator may use the wheel itself to increase the leverage in raising or lowering the wheel to running position or reverse. Viewed still more narrowly, the purpose of my invention is to provide a rack in which the wheel normally stands upright at the back of the vehicle; may then be swung down to horizontal position, which will lower the center of gravity and at the same time afford a leverage longer than the radius of the tire; and may then be rotated to a vertical position where the lower edge of the tire will rest upon the ground or approximately so, after which the tire may be disengaged from the rack.

I accomplish my objects by the mechanism illustrated in the accompanying drawings in which—

Figure 1 is an assembly view showing in full lines the rack and the wheel in traveling position thereon. In dotted lines the wheel is shown in intermediate position.

Figure 2 is a vertical section on the line 2—2, Figure 1.

Figure 3 is a vertical section on the line 3—3, Figure 1.

Figure 4 shows a group of some of the component parts of the carrier illustrating the manner in which they cooperate.

Figure 5 is an assembly view showing the wheel resting upon the ground and about to be applied to or detached from the carrier.

Like numerals denote like parts throughout the several views.

In the present case I have shown the tire mounting in the form of a wire wheel having a sleeve or false hub 1 which in practice fits over the hub of the vehicle. Wire spokes 2 connect this false hub to the rim 3 and on the rim is fastened the tire 4. My device has a holder 6 which is cylindrical and adapted to fit into the opening of the false hub. It has an annular flange 7 at the back for limiting the distance to which it may be inserted. It is closed at the front except for an opening 8 adapted to accommodate a stud 10 which will be hereinafter again referred to. A plate 12 is provided for the front of the holder to retain the false hub upon it. This retaining plate may be secured in various ways, but in the present instance I have shown screws 13 which are fastened to the holder and penetrate slots 14 in the plate. These slots are concentric with the plate and at one end are enlarged to permit the heads of the screws to pass through. By slightly rotating the plate the narrow portion of the slot will be brought beneath the head of the screws and thus cause the plate to remain in place.

Arms 16 project partway into the hollow holder and are secured to the sides thereof by pivot pins 17. These arms are rotatably mounted upon a horizontal bar 20 carried by stationary brackets 21 riveted or otherwise secured to any suitable member 22 of the chassis of the vehicle. The pivot pins 17 have axes which are parallel to bar 20 and the parts are so constructed that the wheel may rotate from the vertical position shown in Figure 5 to the horizontal position shown in dotted lines in Figure 1, while the arms 16 may rotate from what may be termed the "horizontal" position shown in Figure 5 to what may be termed the "upstanding" position shown in full lines in Figure 1. When the arms 16 are lowered, as in Figure 1, the tire will rest upon the ground, and hence it is not necessary for the operator to sustain any of the weight of the wheel when adjusting the wheel to the holder 6.

The downward swing of the arms 16 is limited by a stop or rest 24 which according to the present design consists of a horizontal bar supported in the brackets 21 not far from the bar 20. This prevents the holder from dropping to an inconvenient position when the operator is adjusting the wheel to the holder.

I have provided means for locking the wheel to the arms 16. The mechanism illustrated consists of a hook 26 pivotally supported on a rod 25 extending between the two arms 16. Said hook is adapted to engage a rod 27 carried by lugs 28 formed on the holder 6. When the hooks engage the rod the holder will rotate as a unit with the arms 16.

For supporting the holder in traveling position a bracket 30 is provided, said bracket being riveted or otherwise rigidly fastened to a suitable part 22 of the chassis. At the outer end this bracket has a boss 32 having a threaded recess 33 for taking the threaded inner end of the stud 10 previously mentioned. The boss is adapted to enter into the holder between the pivot pins 17 and arms 16. A flange 34 is provided at the base of boss 32 to form an abutment for the flange 7 of the holder 6. A hook 36 is pivotally secured to bracket 30 and is adapted to engage the rod 25 previously mentioned.

Operation: Let it be assumed that the operator desires to bring up the wheel to the carrier and then put the wheel and carrier in traveling position. He first lowers arms 16 onto the stop bar 24 and disengages the hook 26 from the rod 27 and otherwise brings the carrier parts to the position shown in Figure 5. The plate 12 is removed, after which the operator rolls the wheel to a position behind the holder and then passes the false hub over the holder, as shown in Figure 1. He next applies plate 12, which holds the false hub and other parts of the spare wheel securely upon the holder. He next rotates the wheel to the horizontal position shown in dotted lines in Figure 1. The pivot pins 17 remain stationary at this time, as the arms 16 are supported upon the stop bar 24. As soon as the wheel has reached the horizontal position shown in dotted lines the operator passes the hook 26 over into engagement with the rod 27, as shown in full and in dotted lines in Figure 1. This locks the holder and wheel to the arm 16 and consequently the entire structure becomes locked except that it is movable as a unit about bar 20 as an axis. Said bar 20 is eccentric to the wheel, and it will be observed, is farthest away from that portion of the wheel which is nearest to the operator standing behind the vehicle. In other words, the operator by grasping the portion of the tire located farthest to the left in Figure 1 (dotted line position) obtains a leverage for elevating the wheel to traveling position which will be considerably greater than the radius of the wheel. Furthermore, the greatest leverage comes at the point which is most convenient for grasping the wheel. Consequently the operator may readily swing the parts to upstanding position shown in full lines in Figure 1. He then causes the hook 36 to engage rod 25, which secures the parts in upstanding position. The operator may then at his leisure pass the stud 10 through the plate 12 and holder 6 and screw the stud into boss 32. When this has been accomplished the wheel will be securely held, and the carrier is in readiness for travel. In the preferred form the head 38 of the stud is dished so as to fit over plate 12. It is also polygonal in outline to facilitate rotation.

From the foregoing it will be seen that my present carrier forms a simple and convenient means for enabling a single operator without much exertion to raise a heavy wheel from the ground to traveling position on the carrier. The only time that any appreciable degree of force is required is when the wheel is raised from the horizontal dotted line position of Figure 1 to the upstanding full line position. At such time, however, a convenient leverage is offered, and it is not necessary to bodily lift the wheel, but simply to rotate it about the bar 20 as an axis. This move is not difficult to accomplish because of the leverage afforded, and the fact that the point where the maximum leverage will be found occurs at the point where the operator can most easily grasp the wheel.

Having thus described my invention, what I claim as new and desire to secure by Letters Patent is:

1. A carrier of the class described having an arm, a fixed horizontal pivot for supporting said arm, a holder for the tire, means for temporarily locking the holder to the arm whereby the tire and arm may be rotatably lowered in unison from a position in which the plane of the tire is substantially vertical to one in which it is substantially horizontal, and a holder pivot for securing the holder to the free end of the arm, said holder pivot being parallel to the fixed pivot and located approximately at the center of the tire and parallel to the plane of the tire whereby after the tire and arm have been lowered in unison to a position in which the tire is substantially horizontal it may be unlocked from the arm and then be swung to vertical position, whence it may be removed from the holder.

2. A carrier of the class described having a holder adapted to be lowered to a point where it may engage the wheel when the latter is resting upon the ground and standing in a vertical plane, an arm pivoted to the holder whereby the wheel and holder may be rotated to bring the wheel to horizontal position, a stationary pivot for the inner end of the arm, means for locking the holder to the arm whereby they and the wheel may be rotated as a unit to upstanding position, and means for holding said parts in upstanding position.

3. A carrier of the class described having a holder adapted to be lowered to a point where it may engage the wheel when the latter is resting upon the ground and standing in a vertical plane, an arm pivoted to the holder upon a horizontal axis, means for locking the holder to the arm, a stationary pivot for supporting the inner end of the arm, a stationary bracket and means for securing the arm to the bracket for holding the wheel elevated in upstanding position when the arm has been rotated to upstanding position.

4. A carrier of the class described having a holder adapted to engage the wheel, an arm pivoted to the holder upon a horizontal axis disposed parallel to the plane of the wheel, the arm when in non traveling position being adapted to extend approximately horizontally rearward from the vehicle, a stop for supporting the arm in said position, said arm having a stationary pivot at its inner end and the axis of said stationary pivot being parallel to the holder pivot, means for locking the holder to the arm when the holder has been rotated about its pivot to a position to bring the wheel into a horizontal plane, the arm and holder being adapted to swing as a unit to upstanding position, and means for locking the arm and holder in upstanding position.

5. In a carrier of the class described, in combination, a holder for the wheel, an arm pivoted to the holder about a horizontal axis, and extending rearward therefrom, a pivot for supporting the rear end of the arm and adapted to permit it to rotate about a horizontal axis, a lock for releasably locking the arm to the holder, a bracket adapted to engage the holder when the arm has been rotated to substantially upstanding position, means for temporarily holding the holder in engagement with the bracket, and means for permanently holding the holder in engagement with the bracket.

In witness whereof, I have hereunto subscribe my name.

FREDERICK K. LAWRENCE.